US005969754A

United States Patent [19]
Zeman

[11] Patent Number: 5,969,754
[45] Date of Patent: Oct. 19, 1999

[54] CONTRAST ENHANCING ILLUMINATOR

[76] Inventor: Herbert D. Zeman, 1687 Peach Ave., Memphis, Tenn. 38112

[21] Appl. No.: 08/762,599

[22] Filed: Dec. 9, 1996

[51] Int. Cl.$^6$ .......................... H04N 7/18; H04N 5/208; H04N 5/225

[52] U.S. Cl. ........................ 348/136; 348/61; 348/252; 348/342; 348/370; 382/274

[58] Field of Search .................................. 348/207, 252, 348/625, 744, 62, 63, 79, 136, 584, 335, 340, 342, 343, 344, 164, 370; 382/266, 274; 359/634; H04N 7/18, 5/208, 5/222, 5/225

[56] References Cited

U.S. PATENT DOCUMENTS

| | | | |
|---|---|---|---|
| 3,017,515 | 1/1962 | Welch | 250/208.1 |
| 3,849,910 | 11/1974 | Greenly | 434/22 |
| 4,065,788 | 12/1977 | Meier et al. | 348/625 |
| 4,502,075 | 2/1985 | De Forest et al. | 348/79 |
| 4,591,918 | 5/1986 | Hisano | 348/343 |
| 4,740,812 | 4/1988 | Pryor | 355/77 |
| 4,908,876 | 3/1990 | DeForest et al. | 382/54 |
| 5,041,965 | 8/1991 | Chen | 364/200 |
| 5,220,624 | 6/1993 | Sakamoto et al. | 382/266 |
| 5,231,434 | 7/1993 | Kennedy et al. | 353/122 |
| 5,239,373 | 8/1993 | Tang et al. | 348/14 |
| 5,353,075 | 10/1994 | Conner et al. | 353/122 |
| 5,359,550 | 10/1994 | Chen | 364/708.1 |
| 5,424,838 | 6/1995 | Siu | 356/394 |

OTHER PUBLICATIONS

Peli et al., Image Enhancement for the Visually Impaired, *Investigative Ophthalmology & Visual Science,* vol. 32, No. 8, Jul. 1991, pp. 2337–2350.

In Focus Systems, LitePro 620, http://www.infocus.com/products/projectors/lp620.html.

Texas Instruments, Digital Micromirror Device, http://www.ti.com/dlp/docs/papers/state/state.htm.

*Primary Examiner*—Wendy Garber
*Assistant Examiner*—Ngoc-Yen Vu
*Attorney, Agent, or Firm*—Luedeka, Neely & Graham, PC

[57] ABSTRACT

An apparatus which enhances the visual contrast between bright and dark features of an object by projecting an image of the object onto the object. The features of the projected object image overlay the features of the object such that an observer of the enhanced object senses that the bright features are brighter and the dark features remain the same. A light source illuminates the object, a video imaging means, such as a video camera, creates a video signal representative of the object image, and a video projector receives the video signal from the video camera and projects a visual image of the object. A filter prevents video projector light from reaching the video imaging means, thereby eliminating positive feedback. A preferred apparatus includes a beam separator which causes the image projected from the video projector to illuminate the object from the same perspective that the video imaging means views the object. Preferably, the light source is an infrared light source, the filter transmits infrared light but not visible light, and the beam separator reflects visible light and transmits infrared light. Alternately, the invention visually enhances the edges of features of an object with an unsharp masking edge enhancement technique, thereby making the features of the object easier to distinguish.

23 Claims, 9 Drawing Sheets

CONTRAST ENHANCING ILLUMINATOR

TECHNICAL FIELD

The present invention relates to a method and apparatus for enhancing the visibility of an object to observers of the object. More particularly, it relates to a method and apparatus for increasing the contrast between bright and dark areas of an object by projecting an image of the object onto the object.

BACKGROUND

As a result of the normal aging process, and as a result of diseases such as AIDS, diabetes, and multiple sclerosis, a patient experiences degeneration in the central portion of the retina of the eye, the macula retinae. This condition causes the patient difficulty in distinguishing anything other than very high contrast objects, such as large black letters on a white background. A normal scene of daily life, such as various foods on a plate, becomes almost impossible to interpret due to the patient's inability to distinguish the light and dark areas of the scene.

The contrast of a scene could be enhanced for the patient by means of a pair of glasses equipped with a video display fed with a video signal from a video camera mounted on the patient's head. The contrast of the video display could be adjusted to enhance the contrast of the scene viewed by the video camera. Unfortunately, such an apparatus would require the patient to carry added weight on his head and get used to a completely new way of viewing the world.

Hence, it is desirable to enhance the contrast of a scene while allowing the patient to view the scene with his own eyes. Such contrast enhancement may be accomplished by selective illumination of the scene. Areas of the scene with high reflectivity are illuminated more strongly, while areas of lower reflectivity are illuminated less strongly. In this manner, bright areas become brighter while dim areas remain dim, resulting in contrast enhancement. To achieve color enhancement, each of the three primary colors may be contrast enhanced independently.

It is also desirable to enhance the edges of features in the scene to distinguish the transition from one feature of a scene to the next.

SUMMARY

The present invention is directed to an illumination apparatus that satisfies the need for a means of enhancing the contrast of an object while allowing an observer to view the object directly with his own eyes. The illumination apparatus alters the visual contrast between bright and dark areas of an object by projecting a visual image of the object onto the object. The apparatus consists of a light source which illuminates the object, a video imaging means which measures source light reflected from the object in the form of an image and creates a video output signal representative of the image, and a video projector which receives the video signal from the video imaging means and projects a visual image which is representative of the image measured by the video imaging means. The apparatus also includes a filter which prevents video projector light from reaching the video imaging means while allowing source light, reflected from the object, to reach the video imaging means. In this manner, the filter eliminates positive feedback which would degrade the desired visual effect.

An alternative embodiment of the invention further consists of a beam separator which reflects a portion and transmits a portion of the light that reaches it. The beam separator is positioned between the video imaging means and the object, and between the video projector and the object, such that the visual image projected by the video projector illuminates the object from the same perspective that the video imaging means views the object, thus causing the features of the projected visual image to overlay the corresponding features of the object.

In the preferred embodiment of the invention, the light source is an infrared light source, such as an array of infrared light emitting diodes, or a white light source housed in a container that only allows infrared light to escape. The filter is of a type, and the beam separator is of a type which reflects visible light and transmits infrared light. This embodiment prevents visible light from the video projector from reaching the video imaging means while allowing infrared light, reflected from the object, to reach the video imaging means.

The video imaging means of the preferred embodiment is a charge coupled device (CCD) video camera, and the video projector is a liquid crystal display (LCD) video projector. In an alternate embodiment a digital mirror display (DMD) may be used as the video projector.

In an alternative embodiment of the invention, the visibility of the object is further enhanced by increasing the definition of the edges of the object using an unsharp masking edge enhancement technique. The video imaging means of this embodiment is comprised of a first video camera which measures source light reflected from the object in the form of a focused image and generates a video output signal representative of the focused image, and a second video camera which measures source light reflected from the object in the form of a defocused image and generates a video output signal representative of the defocused image. A difference amplifier produces at its output a video signal representing the difference between the video signals from the two video cameras.

In a second alternative embodiment of the invention, the video signals from the two video cameras are converted into logarithmic video signals prior to subtracting them. The video imaging means of this embodiment is further comprised of a first logarithmic amplifier which converts the video signal at the output of the first video camera into a first logarithmic video signal, a second logarithmic amplifier which converts the video signal at the output of the second video camera into a second logarithmic video signal, and a difference amplifier which produces at its output a logarithmic video signal representing the difference between the first and second logarithmic video signals at its input. An inverse logarithmic amplifier produces at its output the inverse logarithm of the logarithmic difference video signal at its input.

In a third alternative embodiment of the invention, the subtraction of the two video signals is performed in a digital format. This embodiment further comprises an analog-to-digital frame capture means which converts the analog video signals at the output of the first and second video cameras into a digital format which may be processed by a digital processor. A digital processor performs a digital subtraction of the two digital video signals to form a digital difference signal, and a digital-to-analog frame output means converts the digital difference signal into an analog video output signal.

The method of the present invention alters the visual contrast between bright and dark areas of an object by projecting a visual image of the object onto the object, where the visual contrast is sensed by a direct observer of the object. The method includes the steps of illuminating the object by means of a light source, measuring the light reflected from the object in the form of an image and creating a video output signal representative of the image, and projecting a visual image, which is representative of the video signal at the output of the light measuring means, onto the object. The visual image is projected in such a manner that the visual image illuminates the object from the same perspective that the light measuring means views the object. In this manner, the features of the projected visual image overlay the corresponding features of the object.

The method of the invention also includes the step of filtering the light which enters the light measuring means such that light from the projecting means is not measured by the light measuring means, while light from the illuminating means, which is reflected from the object, is measured by the light measuring means. This step eliminates positive feedback which would degrade the desired visual effect.

In an alternative method of the invention incorporating edge enhancement, the light measuring step includes the steps of measuring the light reflected from the object in the form of a focused image and creating a first video output signal representative of the focused image, measuring the light reflected from the object in the form of a defocused image and creating a second video output signal representative of the defocused image, and subtracting the first video signal from the second video signal to form a difference video output signal.

BRIEF DESCRIPTION OF THE DRAWINGS

The preferred embodiments of the invention will now be described in further detail. Other features, aspects, and advantages of the present invention will become better understood with regard to the following description, appended claims, and accompanying drawings where:

DETAILED DESCRIPTION OF PREFERRED EMBODIMENTS

Figure 1:
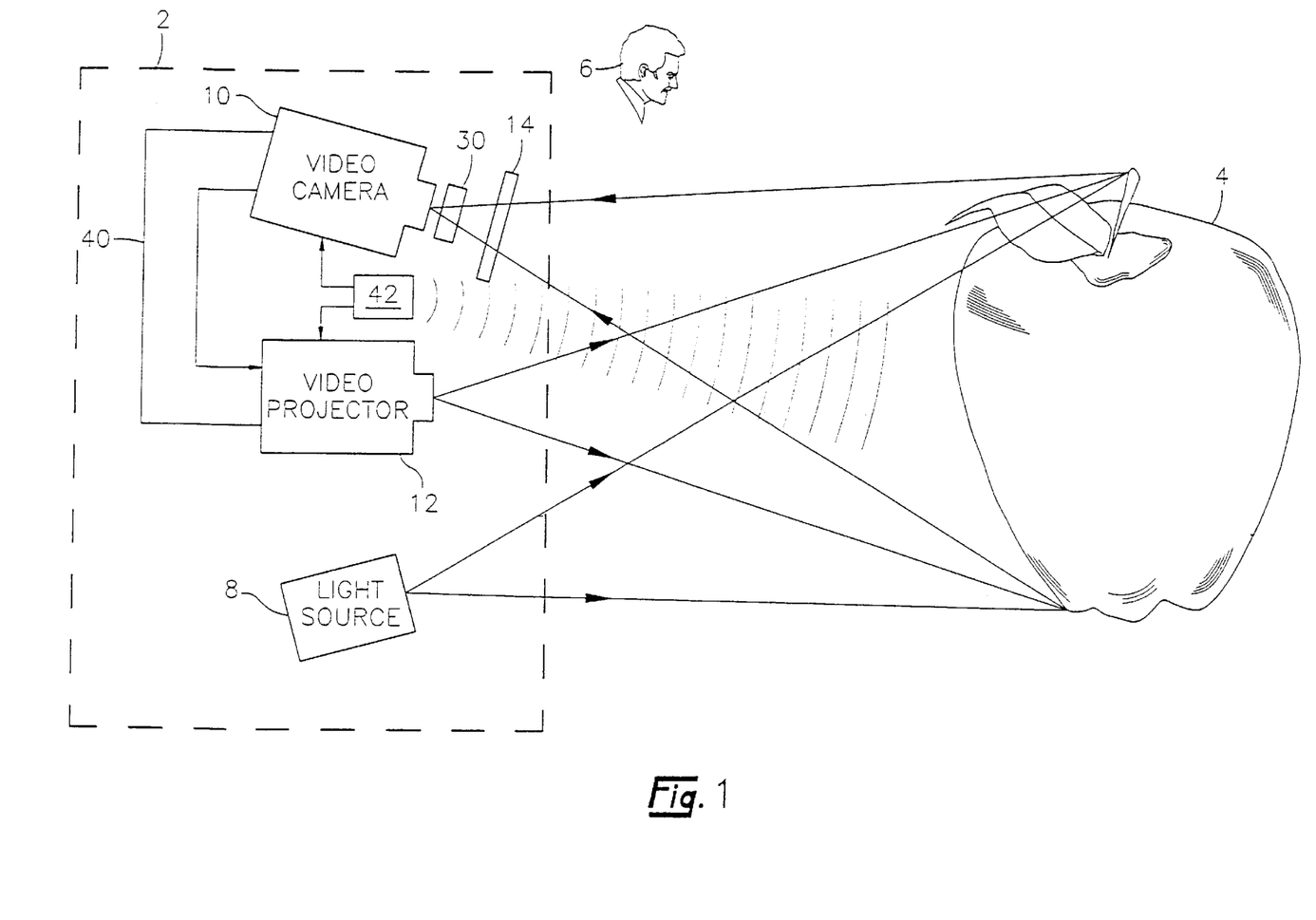
FIG. 1 is a functional block diagram of an embodiment of the invention.

Shown in FIG. 1 is an illumination apparatus 2 which alters the contrast between bright and dark features of an object 4 as viewed by an observer 6. A light source 8 illuminates the object resulting in the reflection of light from the object in the direction of the observer 6 and in the direction of the apparatus. Because of irregularities in the surface of the object 4, and differences in the reflective properties over different areas of the object 4, some areas of the object 4 reflect light more brightly than others. The contrast in light intensity between bright and dark areas can be intensified by projecting an image of the object 4 back onto the object 4, such that the features of the projected image overlay the corresponding features of the object 4. In this manner, the bright areas become brighter while the dark areas remain dark, thus enhancing contrast.

Conversely, the contrast in intensity between the bright and dark areas of the object 4, as sensed by the observer 6, may be decreased by projecting an inverse image of the object 4 back onto the object 4. The bright and dark areas are inverted in the inverse image such that when the inverse image is projected onto the object 4, the dark areas of the object 4 are made brighter and the bright areas of the object 4 remain the same.

With continued reference to FIG. 1, light from the light source 8 reflects from the object 4, and passes into the video camera 10. The video camera lens 30 forms the reflected light into a visual image which the video camera 10 converts into an electrical video signal. This electrical signal is fed from the video output of the video camera 10 to the input of the video projector 12. The video projector 12 projects an image onto the object 4, the image corresponding to the video signal at the input of the projector 12. The image which is projected by the video projector 12 onto the object 4 is basically the same image as that received by the video camera 10, or it is the inverse of the image as discussed previously.

With continued reference to FIG. 1, a distance measuring device 42 measures the distance between the illumination apparatus and the object 4, and produces an electrical signal which is representative of the measured distance. This electrical signal is fed to the video camera 10 which makes the necessary adjustments, based on the measured distance to the object, to bring the image of the object 4 into focus. Similarly, the electrical signal from the distance measuring device is fed to the video projector 12 which makes the necessary adjustments, based on the measured distance to the object, to bring the projected image of the object 4 into focus. The distance measuring device 42 determines the distance between the illumination apparatus and the object 4 by measuring the time required for a pulse, such as an ultrasonic pulse, emitted from the distance measuring device 42 to travel to and reflect from the object 4, and travel back to the distance measuring device 42.

Figure 2A:
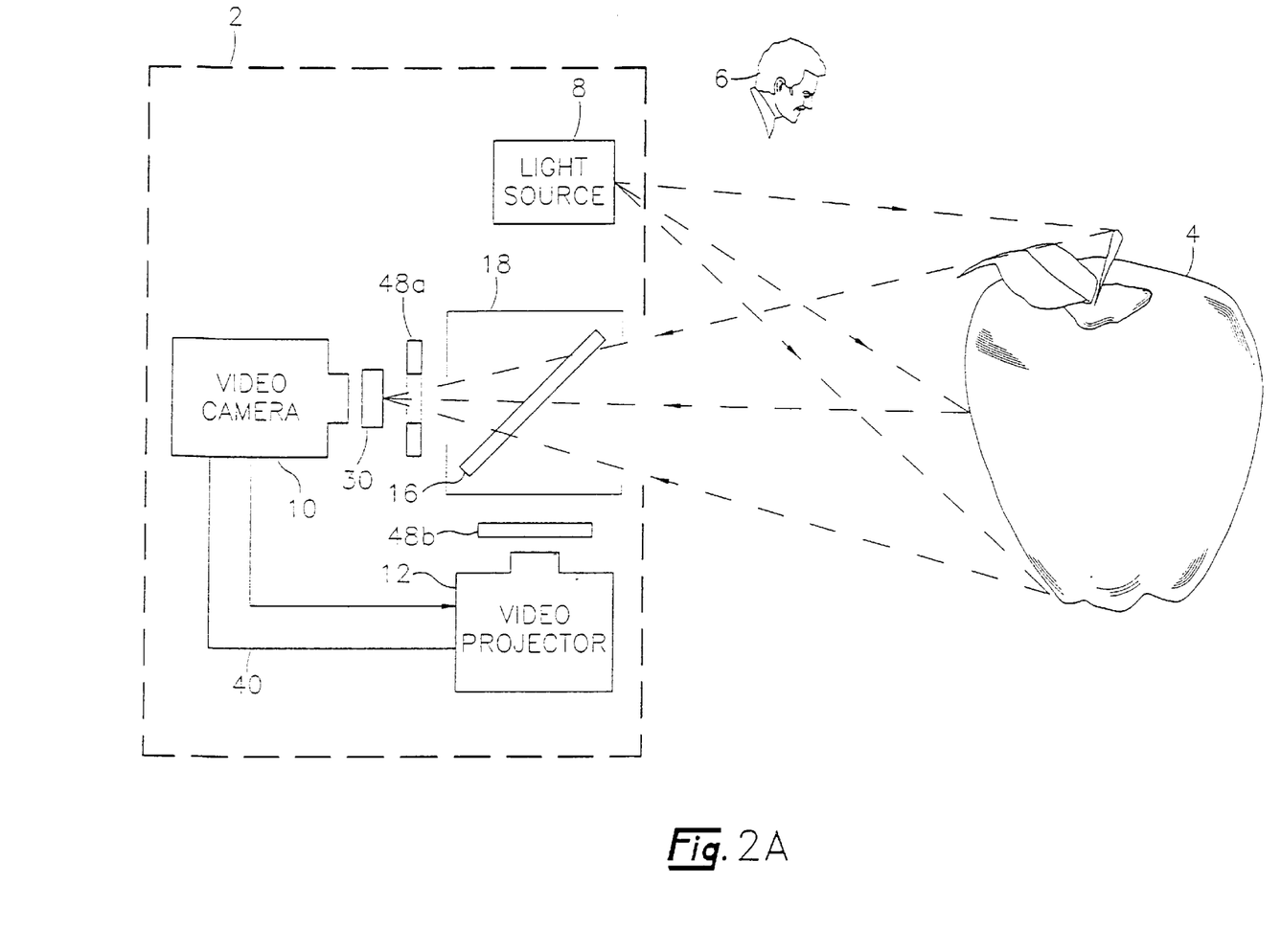
FIG. 2a is a functional block diagram of an alternative embodiment of the invention which incorporates high-speed shutters shown during a first half-cycle of the shutter sequence.
Figure 2B:
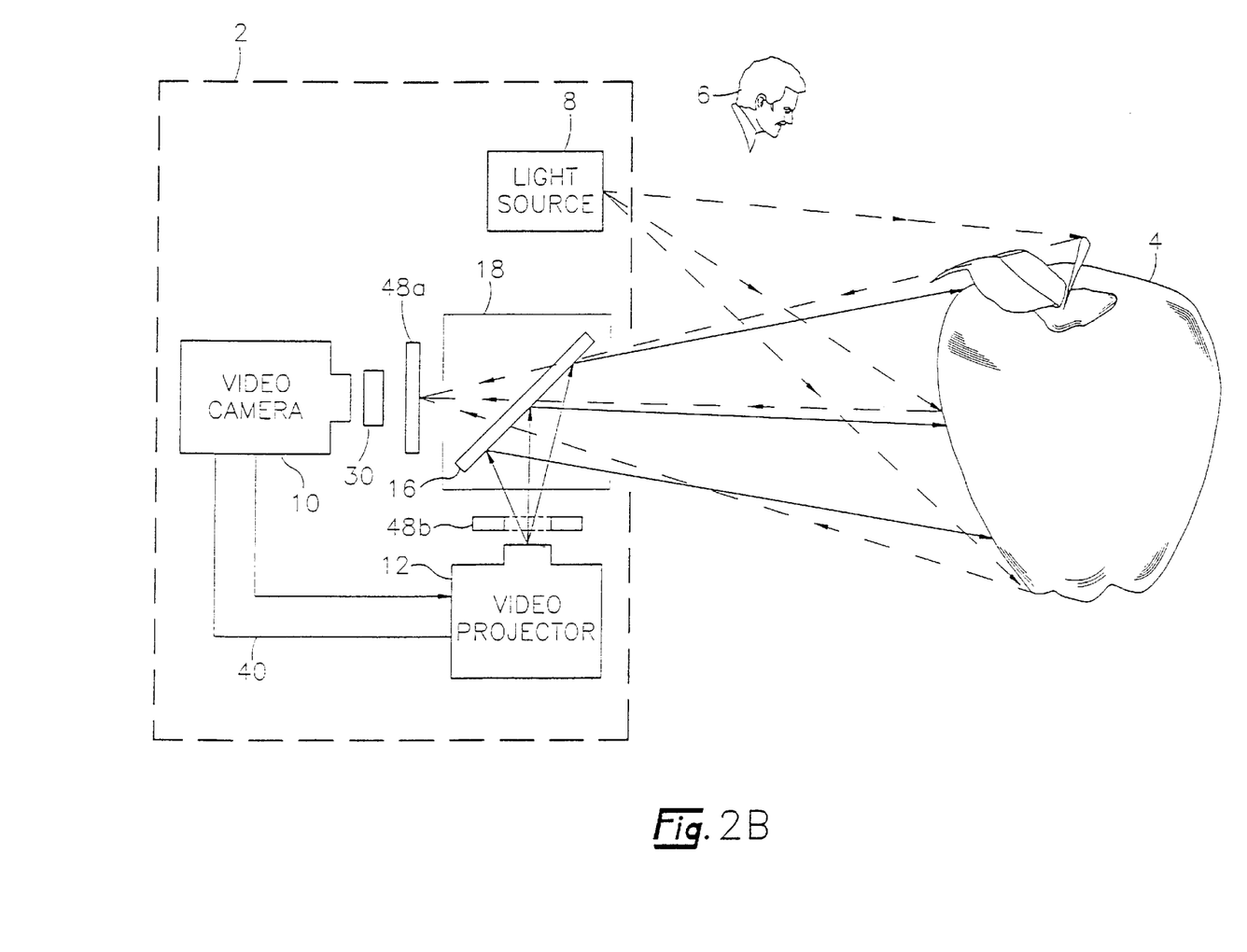
FIG. 2b is a functional block diagram of an alternative embodiment of the invention which incorporates high-speed shutters shown during a second half-cycle of the shutter sequence.

In an alternative embodiment of the invention as shown in FIG. 2a, light from the light source 8 reflects from the object 4 and passes through the beam separator 16 prior to entering the video camera 10. As above, the video camera lens 30 forms the reflected light into a visual image which the video camera 10 converts into an electrical video signal. This electrical signal is fed from the video output of the video camera 10 to the input of the video projector 12. In this embodiment, the video projector 12 projects an image onto the beam separator 16, the image corresponding to the video signal at the input of the projector 12. As shown in FIG. 2b, the beam separator 16 reflects the projected image back onto the object 4.

The beam separator 16 is precisely positioned relative to the video camera 10 and the video projector 12 so that the image reflected from the beam separator 16 and onto the object 4 follows a path to the object 4 which coincides with the path followed by the light reflected from the object 4 to the video camera 10. In other words, the video camera views the object, and the object, from the same perspective. In this manner, the bright and dark features of the projected image precisely overlay the corresponding bright and dark features of the object image as detected by the video camera 10.

The light from the video projector which reflects from the object 4 must be prevented from being detected by the video camera 10. Otherwise, this reflected light would pass into the video camera 10, transfer to the video projector 12 in the form of a video signal, project back onto the object 4, and be reflected back to the video camera 10, thus forming a positive feedback loop. If not prevented, such positive feedback would lead to the creation of an unstable or binary image.

One method of making the video camera 10 insensitive to light from the video projector 12, and thus eliminating positive feedback, is to place high-speed shutters in front of the video camera 10 and the video projector 12. During a first half-cycle of shutter operation as shown in FIG. 2a, the first shutter 48a in front of the video camera 10 is open, and the second shutter 48b in front of the video projector 12 is closed, thus blocking the video projector light while the video camera 10 measures only the source light reflected from the object 4. During a second half-cycle, as shown in FIG. 2b, a first shutter 48a in front of the video camera 10 is closed, and a second shutter 48b in front of the video projector 12 is open, thus allowing the video projector light to illuminate the object 4, but precluding video projector light from reaching the video camera 10.

Figure 2C:
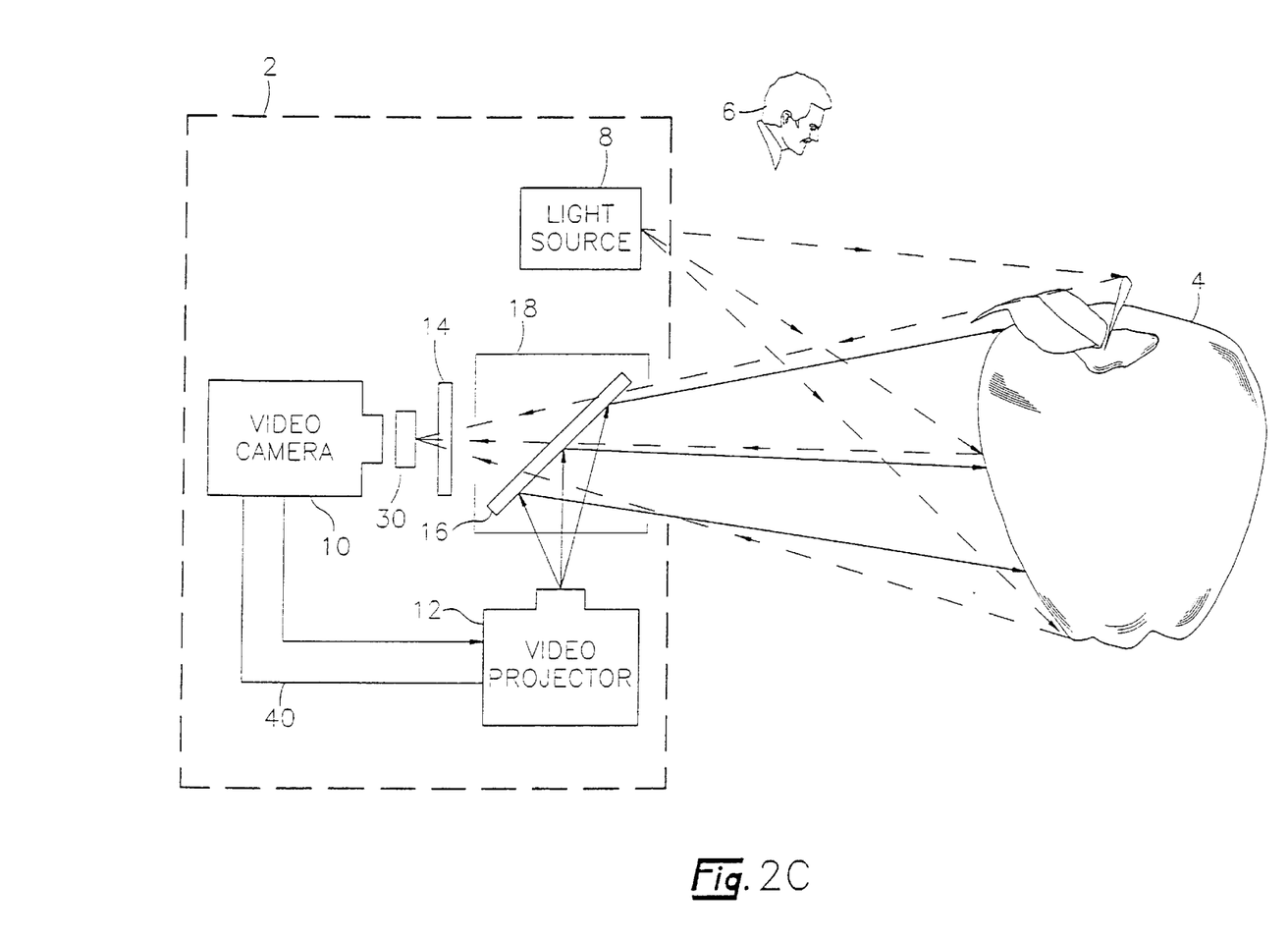
FIG. 2c is a functional block diagram of a preferred embodiment of the invention incorporating a cold mirror beam separator.
Figure 2D:
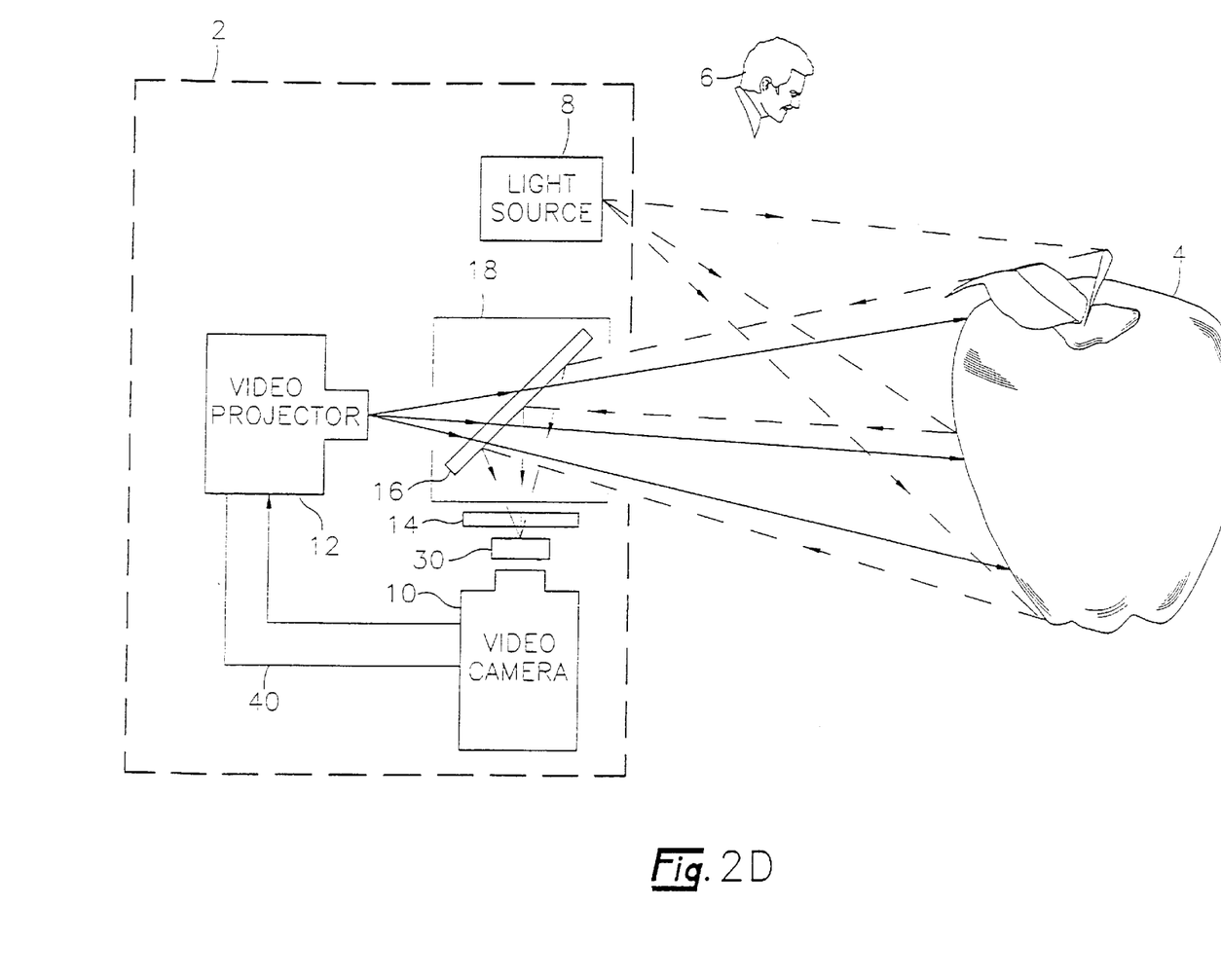
FIG. 2d is a functional block diagram of a preferred embodiment of the invention incorporating a hot mirror beam separator.

Alternatively, a preferred embodiment of the invention prevents positive feedback by employing a filter 14 in front of the video camera lens 30 as shown in FIGS. 2c and 2d. This filter 14 rejects light from the video projector 12 while passing light from the light source 8 which is reflected from the object 4. For the filter 14 to perform this function, the source light reflected from the object 4 must in some way differ from the light projected by the video projector 12.

The preferred method of achieving this difference is to separate the two light signals in wavelength. As shown in FIGS. 2c and 2d, the light source 8 is an infrared light source, emitting light with a wavelength longer than 695 nanometers which is longer than visible wavelengths. One example of such a light source is an Electrophysics Corporation Model IRL600 Infrared Microbeam Safelight (Edmund Scientific Company Model 52,580) which consists of an array of infrared light emitting diodes (LEDs). Another example is a white light, such as a GE 45-watt flood lamp, contained within a housing that is light-tight except for an aperture covered by an infrared-transmitting filter, such as an Edmund Scientific Company Model 60,033. The video projector 12 of this embodiment is an Epson Model ELP-3000 liquid crystal display (LCD) projector which emits light in the visible range. In an alternate embodiment a display which incorporates a digital micromirror device (DMD), such as that produced by Texas Instruments, Inc., may be used as the video projector.

The beam separator 16 of the embodiment shown in FIG. 2c is an Edmund Scientific Company Model 42,414 cold mirror which transmits infrared light but reflects visible light. In this embodiment, the infrared light reflected from the object passes through the cold mirror beam separator 16 and into the video camera 10. The beam separator 16 is mounted in a light-absorbing box 18 which absorbs any visible light from the video projector 12 that passes through the beam separator 16. The box also prevents any infrared light from reaching the video camera 10 directly from the light source 8. As shown in FIG. 2c, the light-absorbing box 18 has three apertures, one which passes light from the video projector 12 to the beam separator 16, one which passes light from the beam separator 16 to the video camera 10, and one which passes light between the object 4 and the beam separator 16.

The beam separator 16 of the embodiment shown in FIG. 2d is an Edmund Scientific Company Model 43,453 hot mirror which transmits visible light but reflects infrared light. In this embodiment, the infrared light reflected from the object is reflected from the hot mirror beam separator 16 and into the video camera 10.

The video camera 10 of the embodiments depicted in FIGS. 2c and 2d is a Cohu Model 631520010000 monochrome charge coupled device (CCD)) video camera. The video camera lens 30 is a Tokina AT-X AF 17 mm f3.5 Nikon-mount lens. The filter 14, mounted on the front of the video camera lens, is an Edmund Scientific Company Model 32,766 infrared transmitting filter with a 695-mm cutoff wavelength which only allows infrared light to enter the video camera 10. To provide the necessary angular adjustment, the video camera 10, lens 30, and filter 14 are mounted on an adjustment stage, such as a Bogen Model 3275, which provides for elevation, azimuth, and roll angular positioning. The three-angle adjustment stage is mounted on a tripod, such as a Bogen Model 3020.

The video camera lens 30 of this embodiment corrects a distortion of the projected image introduced by the Epson Model ELP-3000 video projector 12. This model projector is designed to project an image on an overhead screen whose surface is at an oblique angle to the projection axis. This model projector incorporates a lens which is offset vertically to correct for the "keystone" distortion effect which occurs with oblique angles of projection. In keystone distortion, the magnification of the image varies with vertical position on a screen, with a larger magnification at the top of the screen than at the bottom. However, in typical operation of the invention, the projector 12 and the object 4 are at the same height, such that the projection axis of the video projector 12 forms an angle of nearly 90 degrees with the surface of the object 4. In this situation, the offset lens of the video projector 12 would cause the image projected onto the object 4 to have an "inverted keystone" distortion. The inverted keystone distortion is corrected by vertically offsetting the video camera lens 30 with respect to the optical axis of the camera. This vertical offset is accomplished using a lens mount with a means for vertical position adjustment, such as the Nikon PB-6 Bellows lens mount system with an additional vertical fine motion control stage.

A first alternative embodiment of the invention visually enhances the edges of an object 4 using an unsharp masking technique. With this technique, a blurred version of the object image is produced and is subtracted from the original object image to produce an edge-enhanced image.

Figure 3:
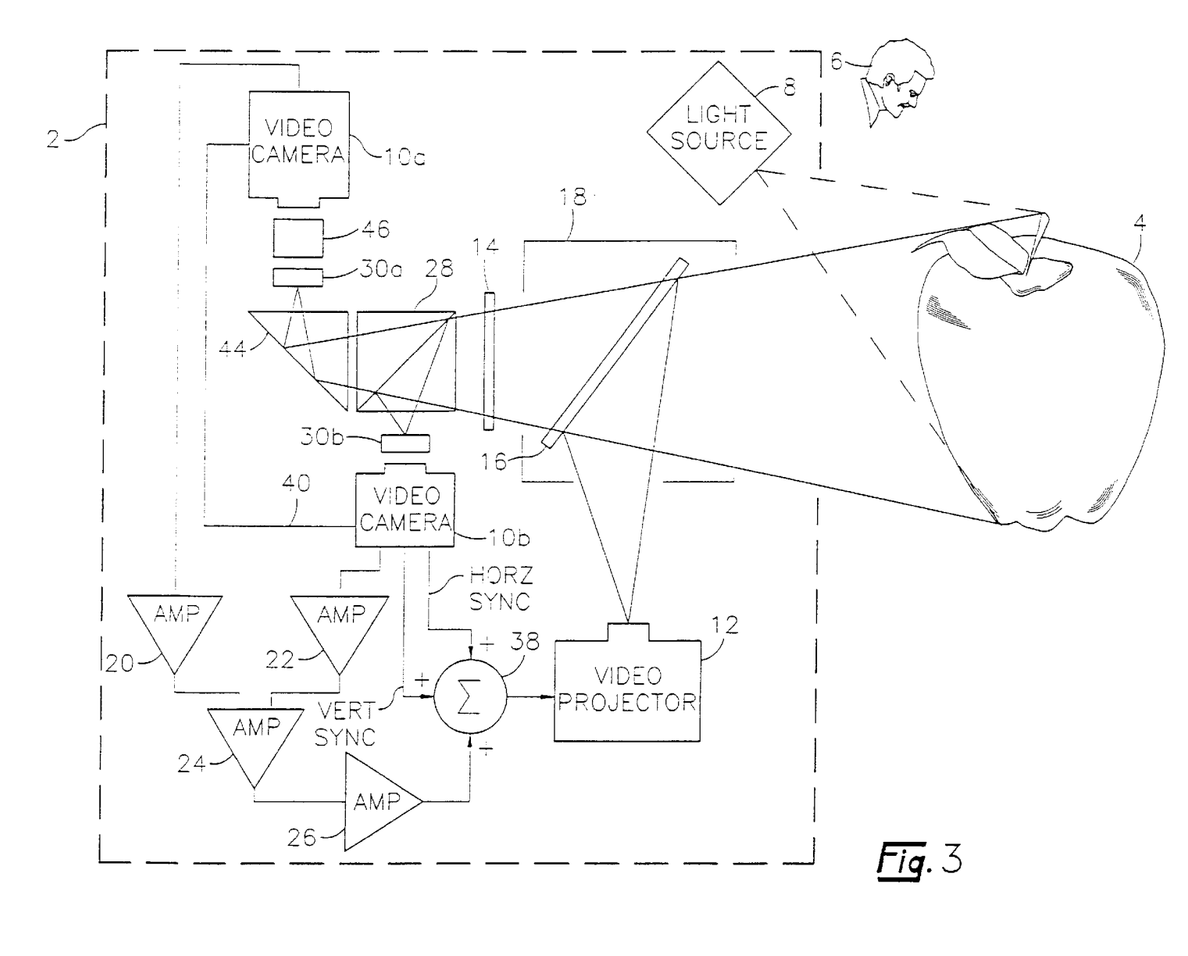
FIG. 3 is a functional block diagram of an alternative embodiment of the invention incorporating contrast enhancement and analog edge enhancement.

The light source 8, video projector 12, filter 14, and light-tight box 18 of this alternative embodiment are identical to, or functionally equivalent with, the corresponding components of the previously described embodiment. However, as shown in FIG. 3, this embodiment incorporates two video cameras 10a and 10b, such as Cohu Model 631520010000 monochrome CCD video cameras, each viewing the object 4 from the same perspective by means of a beam splitter 28, such as an OptoSigma 055-0165 infrared beam splitter prism. The beam splitter 28 provides one half of the light reflected from the object 4 to each of the video cameras 10a and 10b. A reflecting surface 44, such as a right angle prism or mirror, provides a reversal of the object image detected by the first camera 10a to match the reflected (and, therefore, reversed) object image detected by the second camera 10b. One of the cameras is sharply focused while the other is defocused to provide a blurred version of the object image. A zoom lens 46, such as a Vivitar 17–28 mm f 4.0–4.5 lens, allows adjustment of the size of the object image detected by the first camera 10a so that the focused and defocused object images are the same size.

The frame capture of the two cameras is synchronized by means of a locking circuit, such as the GENLOCK circuit which is integral to the Cohu Model 631520010000 video camera. To enable the frame synchronization, the GEN-LOCK ports of the two video cameras 10a and 10b are connected by means of a video cable 40.

The video camera lenses 30a and 30b of this embodiment are also mounted using lens mounts with means for vertical position adjustment to correct for the keystone distortion introduced by the Epson video projector.

The electrical signals at the outputs of the focused and defocused video cameras 10a and 10b are amplified and offset by means of variable gain and offset amplifiers 20 and 22. The signals at the output of the amplifiers 20 and 22 are subtracted by means of a difference amplifier 24, and the difference signal is fed to the input of another variable gain and offset amplifier 26. Since the horizontal and vertical synchronization signals are lost in the subtraction of the video camera signals, these signals must be added back to the difference signal to form a composite video signal. This is accomplished by summing circuit 38 where the difference video signal at the output of the amplifier 26 is summed with the horizontal and vertical synchronization signals from one of the video cameras. The composite video signal at the output of the summing circuit 38 is fed to the input of the video projector 12. As with the previously described embodiment, the video projector 12 projects the visible-light object image onto the beam separator 16 which reflects the object image onto the object 4. In this manner, the edge-enhanced image features overlay the object features.

In a second alternative embodiment of the invention, a logarithmic subtraction of the video signals from the two video cameras is performed. With continued reference to FIG. 3, the amplifiers 20 and 22 of this embodiment are logarithmic amplifiers, and the amplifier 26 is an inverse logarithmic amplifier.

Figure 4:
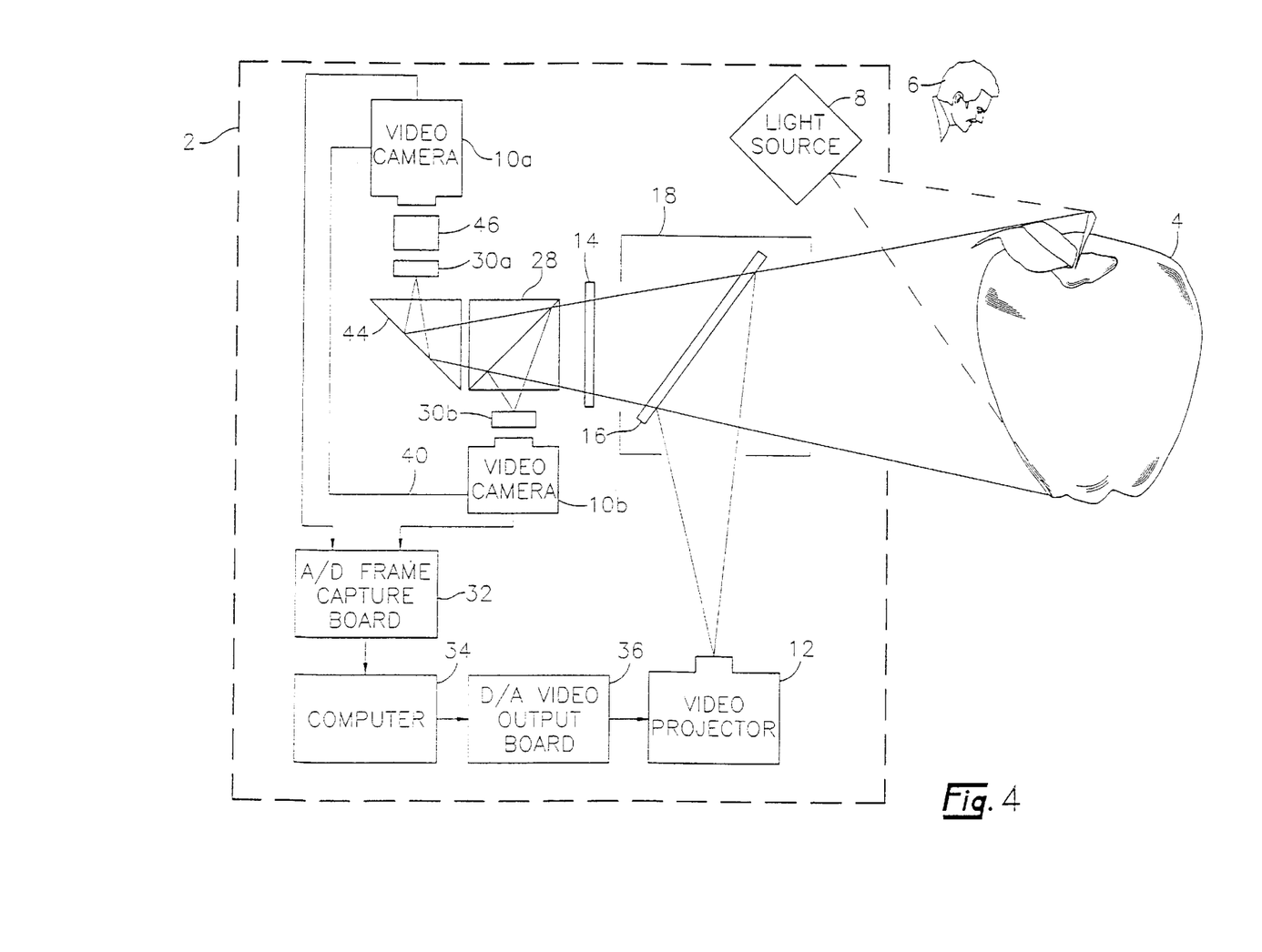
FIG. 4 is a functional block diagram of an alternative embodiment of the invention incorporating contrast enhancement and digital edge enhancement.

A third alternative embodiment of the invention performs the subtraction of the two video camera signals in a digital format. As shown in FIG. 4, the analog video signals at the outputs of the video cameras 10a and 10b are converted into digital format by an analog-to-digital frame capture device 32, such as a Miro DC-20 Video Capture board. A computer 34 incorporating a high-speed processor, such as a Pentium processor operating at 133 MHZ, and sufficient memory, such as 32 megabytes of RAM, calculates the difference of the focused and defocused video signals at about 2–5 frames per second. It is contemplated that higher frame rates may be attained by means of a faster processor. The digital difference signal is fed to a digital-to-analog (D/A) video output device 36, such as a Miro 20-TD Live Video Display board, which converts the digital difference signal into an analog video signal that is compatible with the video projector 12.

Figure 5A:
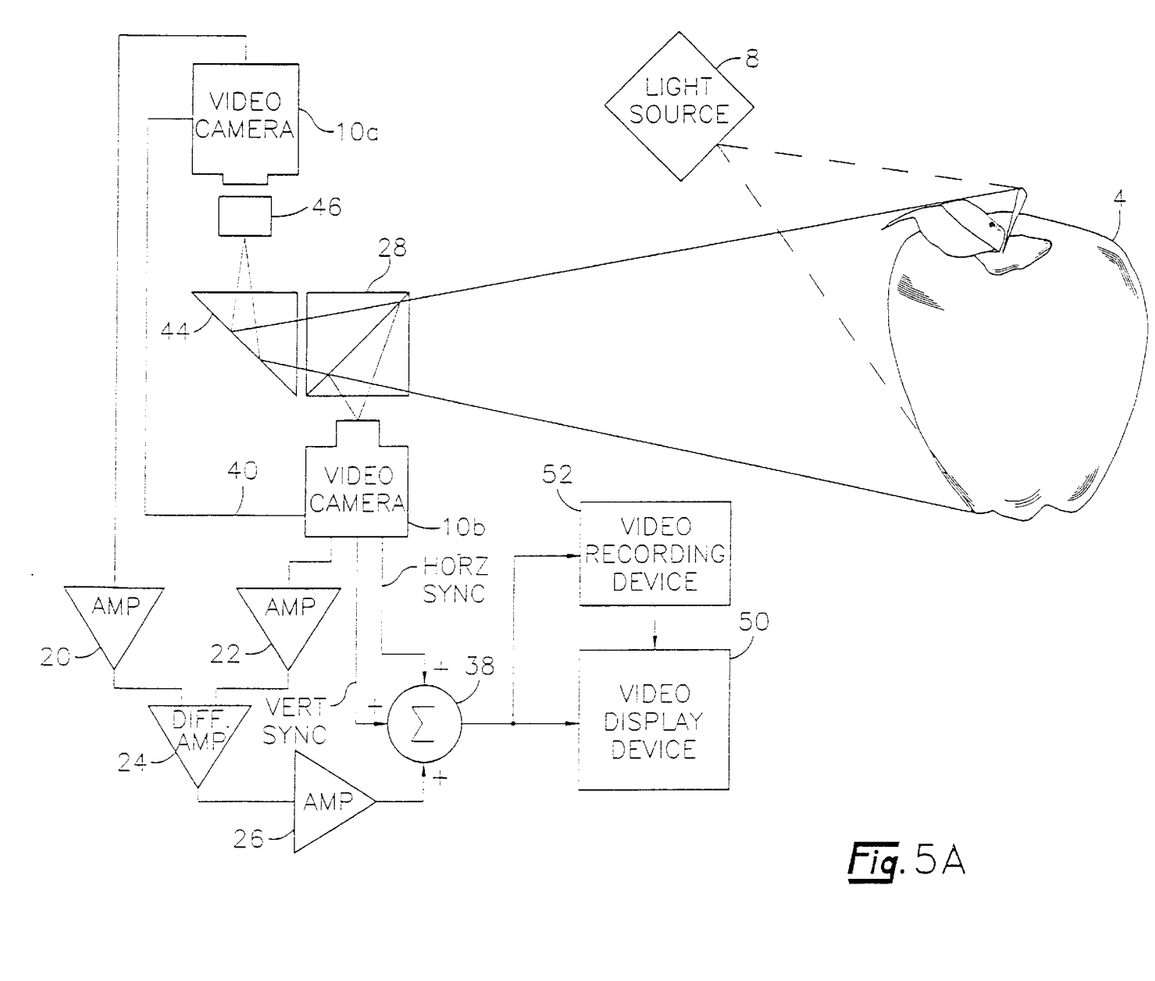
FIG. 5a is a functional block diagram of an alternative embodiment of the invention incorporating analog edge enhancement only.
Figure 5B:
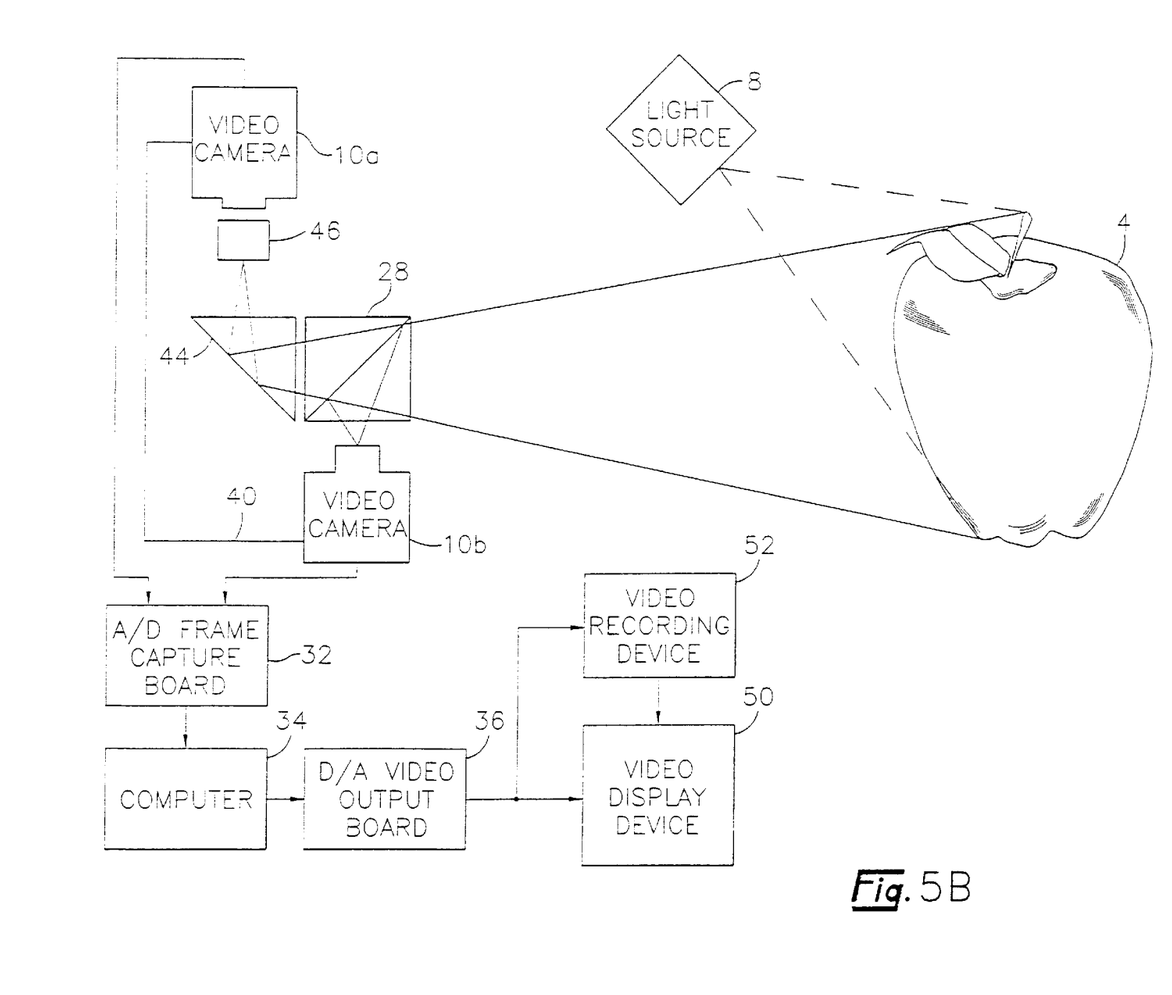
FIG. 5b is a functional block diagram of an alternative embodiment of the invention incorporating digital edge enhancement only.

With reference to FIGS. 5a and 5b, the video signal at the output of the summing circuit 38, or at the output of the D/A video output device 36, may be fed to the input of a video display device 50, such as a television monitor, or to the input of a video recording device 52, such as a video cassette recorder. With this embodiment, the observer 6 views the edge-enhanced image of the scene by viewing either the live or recorded image by means of the video display device 50.

Prior to using the invention shown in FIG. 3 for contrast or edge enhancement, the image of the object 4 captured by the video camera 10 (or video cameras 10a and 10b) and projected by the video projector 12 must be aligned with the object 4. This is accomplished by adjusting the three angular adjustments on the geared tripod head, the vertical offset adjustment of the video camera lens 30, and the zoom control of the video projector lens.

In operation, the invention is used in a darkened room such that the only visible light illuminating the object 4 is from the video projector 12. The observer 6 views the object 4 from nearly the same perspective as that of the video camera 10 so that the region of the object 4 being illuminated by the video projector 12 is within the observer's field of view. The observer 6 adjusts the brightness and contrast controls of the video projector 12 to achieve the optimum enhancement of the object 4.

As mentioned previously, such a device could be used to enhance the contrast of objects viewed by patients suffering from degeneration of the macula retinae. The apparatus could also find application in surgery where it would be used as an illumination device to make it easier for a surgeon to distinguish similar types of tissue. Numerous applications are also contemplated in the entertainment area, such as the creation of interesting lighting effects at concerts, theatrical performances, and discotheques.

It is contemplated, and will be apparent to those skilled in the art from the foregoing specification, drawings, and examples that modifications and/or changes may be made in the embodiments of the invention. Accordingly, it is expressly intended that the foregoing is illustrative of preferred embodiments only, not limiting thereto, and that the true spirit and scope of the present invention be determined by reference to the appended claims.

What is claimed is:

1. An illumination apparatus which alters the visual contrast between bright and dark areas of an object as sensed by a direct observer of the object, the apparatus comprising:

a light source which illuminates the object with source light having a first property;

a video imaging means which measures source light reflected from the object, the reflected light measured in the form of an image, said video imaging means creating a video output signal representative of the image;

a video projector which receives the video output signal from said video imaging means and projects video projector light having a second property onto the object, forming a visual image which is representative of the visual image received by said video imaging means, such that the visual image projected by said video projector illuminates the object from the same perspective that said video imaging means views the object, whereby the features of the projected visual image overlay the corresponding features of the object; and a filter which distinguishes between the first and second properties and prevents the video projector light from reaching said video imaging means while allowing the source light, reflected from the object, to reach said video imaging means, thus eliminating positive feedback which would degrade the desired visual effect.

2. The illumination apparatus of claim 1 further comprising a beam separator which reflects a portion and transmits a portion of the light that reaches it, said beam separator being positioned between said video imaging means and the object, and between said video projector and the object.

3. The illumination apparatus of claim 2 wherein said filter is of a type which transmits infrared light but not visible light, and said beam separator is of a type which reflects visible light and transmits infrared light.

4. The illumination apparatus of claim 2 wherein said filter is of a type which transmits infrared light but not visible light, and said beam separator is of a type which transmits visible light and reflects infrared light.

5. The illumination apparatus of claim 1 wherein said video projector is a liquid crystal display (LCD) video projector.

6. The illumination apparatus of claim 1 wherein said video projector is a digital mirror display (DMD) video projector.

7. The illumination apparatus of claim 1 wherein said video imaging means is a charge coupled device (CCD) video camera.

8. The illumination apparatus of claim 1 wherein said video imaging means includes:
a first video camera which measures source light reflected from the object, the reflected light measured in the form of a focused image, said camera creating a first video output signal representative of the focused image;
a second video camera which measures source light reflected from the object, the reflected light measured in the form of a defocused image, said camera creating a second video output signal representative of the defocused image; and
a difference amplifier which produces at its output a video signal representing the difference between the first and second video output signals present at its input.

9. The illumination apparatus of claim 1 wherein said video imaging means includes:
a first video camera which measures source light reflected from the object, the reflected light measured in the form of a focused image, said camera creating a video output signal representative of the focused image;
a second video camera which measures source light reflected from the object, the reflected light measured in the form of a defocused image, said camera creating a video output signal representative of the defocused image;
a first logarithmic amplifier which converts the video signal at the output of said first video camera into a first logarithmic video signal;
a second logarithmic amplifier which converts the video signal at the output of said second video camera into a second logarithmic video signal;
a difference amplifier which produces at its output a logarithmic video signal representing the difference between the first and second logarithmic video signals at its input; and
an inverse logarithmic amplifier which produces at its output a video signal which is the inverse logarithm of the logarithmic difference video signal at its input.

10. The illumination apparatus of claim 1 wherein said video imaging means includes:
a first video camera which measures source light reflected from the object, the reflected light measured in the form of a focused image, said camera creating a first video output signal representative of the focused image;
a second video camera which measures source light reflected from the object, the reflected light measured in the form of a defocused image, said camera creating a second video output signal representative of the defocused image;
an analog-to-digital frame capture means which converts the analog video signals at the output of said first and second video cameras into a digital format which may be processed by a digital processor;
the digital processor which performs a digital subtraction of the two digital video signals to form a digital difference signal; and
a digital-to-analog frame output means which converts the digital difference signal into an analog video output signal.

11. The illumination apparatus of claim 1 further comprising a distance measuring device which measures the distance between the illumination apparatus and the object and produces an electrical signal representative of this distance, said video imaging means and said video projector being operable to receive the electrical signal from said distance measuring device and focus the object image corresponding to the distance represented by the electrical signal from said distance measuring device.

12. The illumination apparatus of claim 1 wherein the light emanating from said light source is infrared light.

13. The illumination apparatus of claim 12 wherein said light source is comprised of a white light source housed in a container that only allows infrared light to escape.

14. The illumination apparatus of claim 12 wherein said light source is comprised of an array of infrared light emitting diodes.

15. The illumination apparatus of claim 1 wherein said filter comprises:
a first shutter means which opens and closes cyclically, said first shutter means being open during a first half-cycle and closed during a second half-cycle, said first shutter means allowing source light reflected from the object to reach the video imaging means only during the first half-cycle;
a second shutter means which opens and closes cyclically, said second shutter means being closed during a first half-cycle and open during a second half-cycle, said second shutter means allowing light projected from the video projector to reach the object only during the second half-cycle; and
a synchronizing means which causes the first shutter means to open only after the second shutter means is completely closed, and causes the second shutter means to open only after the first shutter means is completely closed.

16. The illumination apparatus of claim 15 wherein said first and second shutter means operate at no less than 120 cycles per second.

17. A method of altering the visual contrast between bright and dark areas of an object as sensed by a direct observer of the object, the method comprising the steps of:
illuminating the object by means of a light source having a first property;
measuring the light reflected from the object in the form of an image and creating a video output signal representative of the image;
projecting a visual image with light having a second property, which is representative of the video output signal at the output of the light measuring means, onto the object in such a manner that the projected visual image illuminates the object from the same perspective that the light measuring means views the object, thus causing the features of the projected visual image to overlay the corresponding features of the object; and filtering the light which enters the light measuring means such that light having the second property from the projecting means is not measured by the light measuring means, while light having the first property from the illuminating means, which is reflected from the object, is measured by the light measuring means, thus eliminating positive feedback which would degrade the desired visual effect.

18. The method of claim 17 wherein the light measuring means is a CCD video camera.

19. The method of claim 17 wherein the projecting means is an LCD video projector.

20. The method of claim 17 wherein the projecting means is a DMD video projector.

21. The method of claim 17 wherein said light measuring step further comprises the steps of:

measuring the light reflected from the object in the form of a focused image and creating a first linear video output signal representative of the focused image;

measuring the light reflected from the object in the form of a defocused image and creating a second linear video output signal representative of the defocused image; and subtracting the first linear video signal from the second linear video signal to form a difference linear video output signal.

22. The method of claim 17 wherein said light measuring step further comprises the steps of:

measuring the light reflected from the object in the form of a focused image and creating a first linear video output signal representative of the focused image;

measuring the light reflected from the object in the form of a defocused image and creating a second linear video output, signal representative of the defocused image;

converting the first linear video signal, which represents the focused image, into a first logarithmic video signal;

converting the second linear video signal, which represents the defocused image, into a second logarithmic video signal;

subtracting the first logarithmic video signal from the second logarithmic video signal to form a difference logarithmic video signal; and converting the difference logarithmic video signal into a linear video output signal representative of the object image.

23. A method of altering the visual contrast between bright and dark areas of an object as sensed by a direct observer of the object, the method comprising the steps of:

illuminating the object by means of an infrared light source;

measuring the infrared light reflected from the object in the form of an image and creating a video output signal representative of the image;

projecting a visual image with visible light, which is representative of the video output signal at the output of the light measuring means, onto the object in such a manner that the projected visual image illuminates the object from the same perspective that the light measuring means views the object, thus causing the features of the projected visual image to overlay the corresponding features of the object; and filtering the light which enters the light measuring means such that the visible light from the projecting means is not measured by the light measuring means, while infrared light from the light source, which is reflected from the object, is measured by the light measuring means, thus eliminating positive feedback which would degrade the desired visual effect.

* * * * *